United States Patent [19]

Yumoto et al.

[11] Patent Number: 4,459,698
[45] Date of Patent: Jul. 10, 1984

[54] VARIABLE EQUALIZER

[75] Inventors: Osamu Yumoto, Kokubunji; Toshiro Suzuki, Tama; Hiroshi Takatori, Kokubunji; Yoshitaka Takasaki, Tokorozawa, all of Japan

[73] Assignee: Hitachi, Ltd., Tokyo, Japan

[21] Appl. No.: 358,437

[22] Filed: Mar. 15, 1982

[30] Foreign Application Priority Data

Mar. 20, 1981 [JP] Japan ............................ 56-38224[U]

[51] Int. Cl.³ .......................................... H04L 25/03
[52] U.S. Cl. ...................................... 375/16; 333/18; 364/724
[58] Field of Search ............... 375/12, 14, 16; 333/18; 364/724

[56] References Cited

U.S. PATENT DOCUMENTS

| | | | |
|---|---|---|---|
| 3,508,153 | 4/1970 | Gerrish et al. | 375/16 |
| 3,742,360 | 6/1973 | Ragsdale | 375/13 |
| 3,781,720 | 12/1973 | Mueller | 375/14 |
| 4,336,613 | 6/1982 | Hewes | 333/18 |
| 4,349,889 | 9/1982 | Van den Elzen et al. | 375/16 |

OTHER PUBLICATIONS

Takatori et al., "A New Equalizing Scheme for Digital Suscriber Loop" Nov. 1981, Conference NCT 8, IEEE National Telecommunication Conference Innovative Telecommunication E/5/1-6.

Primary Examiner—Robert L. Griffin
Assistant Examiner—Stephen Chin
Attorney, Agent, or Firm—Antonelli, Terry & Wands

[57] ABSTRACT

A small-sized LSI variable equalizer is provided for accurately equalizing waveforms of signals transmitted via transmission lines of different distances. Variable equalizer units capable of stepwise changing the equalizing characteristics thereof are connected in series with each other with the variable equalizer units having variable step widths different from each other. An output signal of the variable equalizer units is compared with a reference signal to convert the comparison output signal to a digital signal which includes an upper order bits and lower order bits, whereby one of the equalizer units which has a wide variable step width is controlled by the upper order bits and the other of the equalizer units which has a narrow variable step width is controlled by the lower order bits.

13 Claims, 7 Drawing Figures

VARIABLE EQUALIZER

BACKGROUND OF THE INVENTION

1. Field of the Invention

The present invention relates generally to a variable equalizer, and more specifically, to the arrangement of a waveform equalizer included in a repeater or a receiver when digital signals such as PCM signals are transmitted via paired cables or co-axial cables to a long-distance place.

2. Description of the Prior Art

Such a transmission line as a co-axial cable usually has a transmission loss due to a skin effect on the line conductors, and the transmission loss is proportional to the square root of the frequency (f) of the transmission signal. That is, the transmission line has a $\sqrt{f}$ frequency characteristic.

In order to transmit data over a long distance via a transmission line having such a characteristic, it is necessary to install variable equalizers called $\sqrt{f}$ equalizers at the terminal or intermediate points of the line to thereby compensate for the line transmission loss. In the event that $\sqrt{f}$ equalizers are used, both the gain and frequency of the transmission signals must be adjusted according to the length or distance of the transmission line in order to compensate for the $\sqrt{f}$ frequency characteristic. More specifically, the level of the input signal is detected to estimate the length of the transmission line and offer the optimum gain and frequency characteristics to the line. In a conventional PCM transmission system, $\sqrt{f}$ equalizers are inserted in the transmission line at equal intervals and each of the $\sqrt{f}$ equalizers have a narrow variable gain range. In the event that known Bode type $\sqrt{f}$ equalizers are used in a PCM transmission system such as telephone subscriber lines in which the line length ranges from 100 m to 10 Km, for example, the $\sqrt{f}$ equalizers are inserted in the lines at intervals of 1.7 Km and the equalizer has a narrow variable gain range of several dB. For this reason, many repeaters must be installed in longer line applications. In order to avoid economic undesirability of using a large number of repeaters, it might be possible to expand the variable gain range of the equalizer. In this case, since the gain range of the Bode type $\sqrt{f}$ equalizer is controlled only by one or two element values therein, the element values will decrease in accuracy as the gain ranges of the equalizer is expanded, which leads to increased errors in operation of the equalizer.

Moreover, in order to widen the gain range of the equalizer and offer a more precise equalization operation, a large sized equipment is required. This makes it impossible to practically build in or incorporate such an equalizer, for example, in a telephone set.

SUMMARY OF THE INVENTION

Accordingly, it is an object of the present invention to provide a variable equalizer which has a wide equalization range and allows an accurate equalization over a wide band.

Another object of the present invention is to realize variable equalizer with a less consumption of power and a less mounting space in the form of a large scale integrated (LSI) circuit, which realized housing in a telephone set.

In order to achieve the above objects, the present invention provides a variable equalizer wherein variable equalizer units are connected in series with each other and each has a stepwise variable range, said equalizer units have variable step widths different from each other, an output signal of said variable equalizer units connected in series is compared with a reference signal, said comparison output signal is converted to a digital signal, said digital signal comprising an upper order bit signal and a lower order bit signal, and one of said variable equalizer units which has a wide variable step width is controlled according to said upper bit signal while the other of said variable equalizer units which has a narrow variable step width is controlled according to said lower bit signal. Since the upper order bit signal is used to control one of said variable equalizer units which has a wide step width for coarse adjustment, the equalization range can be freely expanded to the possible maximum gain band of operational amplifiers used in the equalizer. Further, the lower order bit signal is used to control the other of said variable equalizer units which has a narrow step width for fine adjustment. As a result, $\sqrt{f}$ characteristic can be compensated for by the coarse and fine adjustment.

In accordance with an aspect of the present invention, since the variable equalizer units are adjusted in a stepwise manner, each equalizer unit can be comprised of switches, capacitors and a few operational amplifiers, which are all able to be driven by digital control signals, whereby the equalizer of the present invention can be realized in the form of an integrated circuit including MOS or bipolar transistors and so on.

BRIEF DESCRIPTION OF THE DRAWINGS

The above-mentioned and other features and objects of the invention will become more apparent by reference to the following description taken in conjunction with the accompanying drawings, in which.

DESCRIPTION OF PREFERRED EMBODIMENTS

Figure 1:
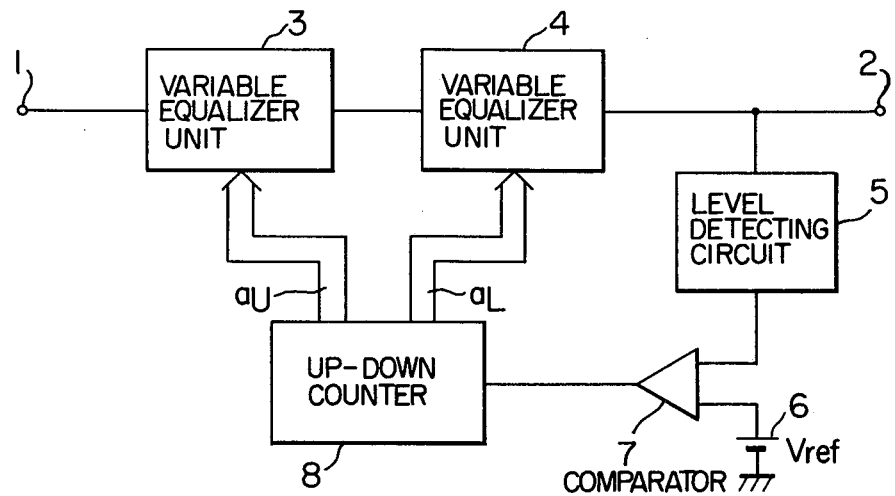
FIG. 1 is a block diagram of a variable equalizer in accordance with an embodiment of the present invention.

Referring now to FIG. 1, there is shown a block diagram of a variable equalizer in accordance with an embodiment of the present invention.

In the operation of the embodiment of FIG. 1, a signal to be equalized such as a bipolar pulse signal is applied from an input terminal 1 to first and second variable equalizer units 3 and 4 connected in series with each other. The signal equalized at the equalizer units 3 and 4 is supplied via an output terminal 2 to a subsequent signal processing circuit (not shown). A part of the equalized output signal of the second equalizer unit 4 is also applied to a level detecting circuit 5 to convert it to a d.c. signal through its peak detection or rectification operation. The converted d.c. signal is sent to one input of a comparator 7. A reference signal $V_{ref}$ from a reference signal source (or reference voltage source) 6 is also sent to the other input of the comparator 7. At the comparator 7, it is decided whether or not the d.c. signal is greater than the reference signal (voltage) $V_{ref}$. The decision result is supplied to an up-down counter 8 as its trigger pulse. Upon receiving the trigger pulse, the up-down counter 8 will generate a digital binary signal. The binary signal consists of an upper order bit signal $a_U$ and a lower order bit signal $a_L$. The former signal $a_U$ is applied as a control signal to the first variable equalizer unit 3 while the latter signal $a_L$ is applied as a control signal to the second variable equalizer unit 4.

The variable equalizer unit 3 is designed so that the bit signal $a_U$ will cause a stepwise change of the equalizing range of the equalizer unit to thereby provide a suitable equalization for a plurality of transmission lines which have different lengths of $L_1, L_2 \ldots L_n$. In other words, the equalizer unit 3 is a combination of different equalizer sub-units which have different equalization characteristics. On the other hand, the second variable equalizer unit 4 is designed so that the bit signal $a_L$ will cause a stepwise change of the equalizing range of the equalizer unit 4 to thereby provide a suitable equalization for a plurality of transmission line lengths $l_1, l_2, \ldots l_m$ ("m" segments of the line length of $L_R$ to $L_{R+1}$ equally divided). As a result, the variable equalizer units can be arranged so as to provide a proper equalization for a transmission line length $L_i + l_j$ ($0 \leq i \leq n, o \leq j \leq m$), where values "n" and "m" can be properly determined by taking into consideration the range and permissible equalizing error of the line length. Although the variable equalizer has been explained in the form of two stage configuration for coarse and fine adjustment in this embodiment, it will be readily understood that the number of stages used may be increased in order to effect a more precise equalization.

In this way, the upper and lower bits $a_U$ and $a_L$ are used to control the respective variable equalizer units 3 and 4 and the values of line lengths L and l are selected so as to make zero a difference between the two inputs of the comparator 7 to stop the up-down counter 8, whereby the optimum equalization can be achieved for an extremely wide range of transmission line lengths. In addition, the up-down counter can produce a digital signal indicative of the currently selected line lengths L and l and thus the produced digital value signal can be stored in a memory as the equalizing information. For this reason, in the event that transmission lines for variable equalizers to be used are known with respect to the line length, control signals to be used for the equalizers may be preprogrammed beforehand according to the line length.

Figure 2:
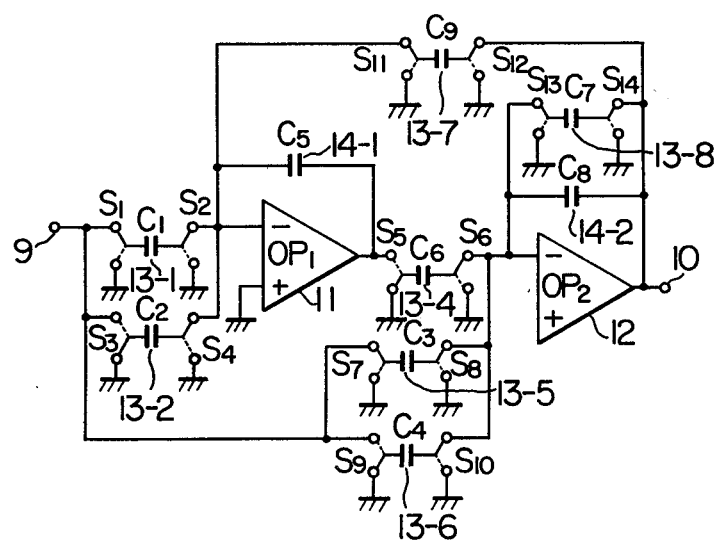
FIG. 2 is a circuit diagram of an embodiment of a filter which constitutes a variable equalizer unit used in the variable equalizer of the present invention.

FIG. 2 shows a circuit diagram of an embodiment of the variable equalizer unit 3 or 4 in FIG. 1, in which case, the equalizer unit is configured so as to have a single frequency characteristic for brevity of explanation.

As shown, the circuit of FIG. 2 comprises first and second operational amplifiers 11, 12, capacitors 13-1, 13-2, 13-4 to 13-8, 14-1, 14-2, and two-position switches S1 to S14. The switches allow switching between two positions (shown by solid and dotted lines and ones of which can be connected to respective capacitors 13-1, 13-2, 13-4 to 13-8) at a predetermined periodical rate. Since the circuit of FIG. 2 is comprised merely of capacitors, switches and operational amplifiers, it can be fabricated into a semiconductor integrated circuit, that is, a small chip.

A transfer function F(Z) of the circuit of FIG. 2 between an input terminal 9 and an output terminal 10 is expressed as follows.

$$F(Z) = \frac{C_3C_5 + (C_1C_0 - C_4C_5 - C_3C_5)Z^{-1} + (C_4C_5 - C_2C_6)Z^{-2}}{C_5(C_8 + C_7) + (C_6C_9 - C_5C_7 - 2C_5C_8)Z^{-1} + C_5C_8Z^{-2}}$$

where $Z^{-n}$ (n=1, 2) denotes an operator and functions to delay the circuit sampling timing by n times the sampling period, and $C_1$ to $C_9$ represent respective capacitances of the capacitors 13-1, 13-2, 13-4 to 13-8, 14-1, and 14-2. This circuit is well known as a filter and thus the detailed explanation of the configuration and operation thereof will be omitted herein. For details, for example, refer to "A General Active Switched Capacitor Biguard Topology for Precision MOS Filter", by K. R. Laker et al, Proc. of ISCAS '80, pages 304 to 308, April, 1980. Therefore, various frequency characteristics can be realized by suitably selecting the capacitances $C_1$ to $C_9$. While the equalizer or filter adapted for transmission lines of a constant length has been disclosed in this embodiment for the purpose of simplification of the drawing, plural kinds of filters may be simultaneously realized for applications to different transmission lines with capacitors 13-1, 13-2, and 13-4 to 13-8 each have plural capacitances in parallel and by using a selected one of the parallel connected capacitors, respectively.

Figure 3:
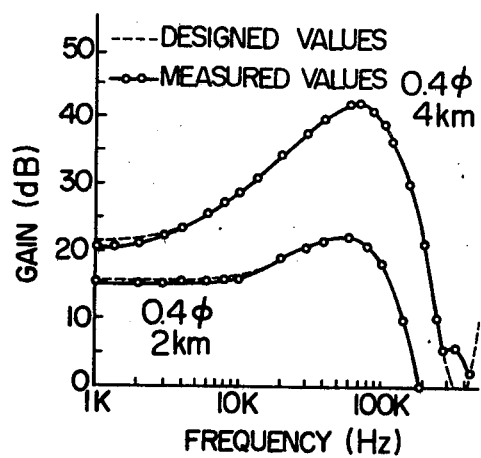
FIG. 3 is a frequency characteristic diagram showing relationships between the frequency and the gain of the filter of FIG. 2.

Turning now to FIG. 3, there is shown a graph showing a relationship between the gain and frequency when different equalizers are realized in the form of the circuit of FIG. 2 for 4 Km and 2 Km telephone transmission lines (the lines are each of 0.4 mm diameter). In the same figure, solid lines represent measured values and dotted lines represent designed values. The equalizers used in the above experiment are made of the two equalizer units of FIG. 2 connected in series, one is a $\sqrt{f}$ equalizer unit which has a $\sqrt{f}$ characteristic and the other is a 100% roll-off raised cosine filter whose gain is substantially constant in the lower band below 100 KHz and abruptly drops in the upper band above 100 KHz. In this case, capacitors 13-1, 13-2, 13-4 to 13-8, 14-1, and 14-2 used in the equalizer and filter have the following values. In the Table below, the values of the capacitors are expressed in terms of ratio of the value 10 pF of the capacitor 14-1 with respect to other capacitors.

| $\sqrt{f}$ equalizer | |
|---|---|
| 4 Km line | 2 Km line |
| $C_1 = 1.597$ | $C_1 = 8.296$ |
| $C_2 = 1.497$ | $C_2 = 1.217$ |
| $C_3 = 1.497$ | $C_3 = 1.419$ |
| $C_4 = 1.00$ | $C_4 = 2.491$ |
| $C_5 = 1.174$ | $C_5 = 2.107$ |
| $C_6 = 13.20$ | $C_6 = 1.732$ |
| $C_7 = 18.00$ | $C_7 = 1.580$ |
| $C_9 = 1.00$ | $C_9 = 1.00$ |
| 100% Roll-off raised cosine filter | |
| 4 Km line | 2 Km line |
| $C_1 = 11.11$ | $C_1 = 4.156$ |

-continued

| | |
|---|---|
| $C_2 = 1.109$ | $C_2 = 3.084$ |
| $C_3 = 2.402$ | $C_3 = 15.10$ |
| $C_4 = 3.106$ | $C_4 = 1.00$ |
| $C_5 = 1.716$ | $C_5 = 1.00$ |
| $C_6 = 1.548$ | $C_6 = 4.289$ |
| $C_7 = 0$ | $C_7 = 0$ |
| $C_9 = 1.00$ | $C_9 = 1.072$ |

Further, amplifiers of the type 2527 available from Harris company are used as the operational amplifiers 11 and 12, and switches of the type VMOS SD 203 available from Signetics company are used as the switches $S_1$ to $S_9$.

The operational amplifiers, switches and capacitors used in this embodiment are all fabricated easily by the known semiconductor manufacturing technique or process (in particular, MOS process). For this reason, the circuit according to the present invention can be readily manufactured on a mass production basis by the semiconductor fabrication technique although many components are used in the invention, which leads to a low production cost thereof.

Figure 4:
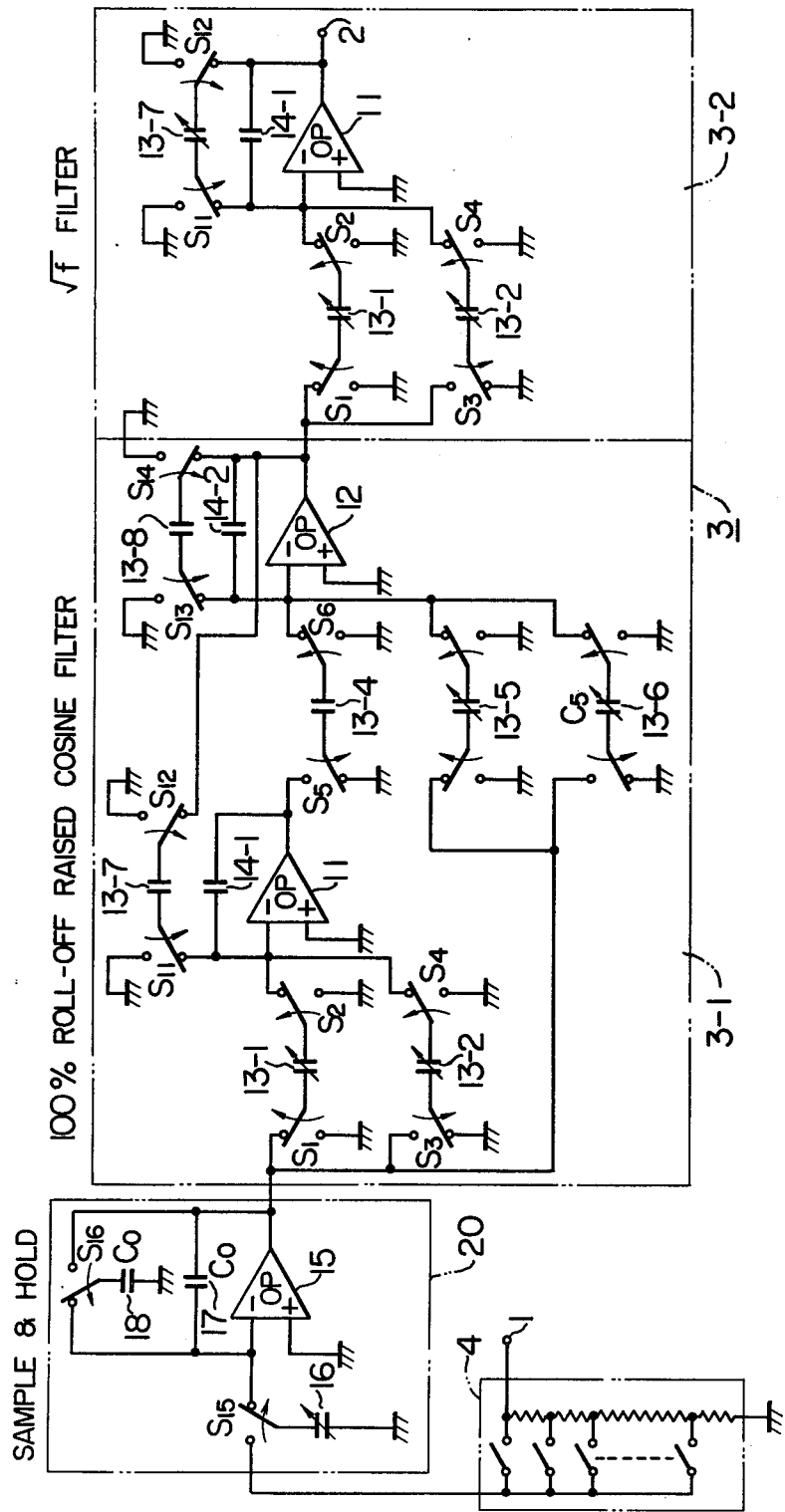
FIG. 4 is a circuit diagram of variable equalizer units used in a variable equalizer in accordance with another embodiment of the present invention.

FIG. 4 is a circuit diagram of another embodiment of the variable equalizer according to the present invention, including the variable equalizer unit 3 which, in this embodiment, comprises a 100% roll-off raised cosine filter 3-1 and a $\sqrt{f}$ filter 3-2 for coarse adjustment, as well as the variable equalizer unit 4 which, in this embodiment, comprises a voltage divider for fine adjustment. The voltage divider 4 is flat in frequency characteristic and variable in gain.

In operation, an input analog signal to be equalized is applied to the input terminal 1. The variable equalizer unit 4 is used to make a fine adjustment of a level within one step of the steps in the equalizer unit 3. Alternatively, the unit 4 may be a flat AGC circuit which is capable of adjusting the level between 0 and 12 dB with every increment of 0.2 dB step width. However, in this embodiment, a simple voltage divider consisting of resistors alone is used as the equalizer unit 4. On the other hand, an output of the equalizer unit 4 is supplied to a sample and hold circuit 20 to generate a sampling signal. The sampling signal is used to drive the variable equalizer unit 3. More specifically, the sample and hold circuit 20 includes an operational amplifier 15, switches S15, S16, a feedback capacitor 17, and switched capacitors 16, 18. In the circuit 20, switching of the switches S15 and S16 at a predetermined periodical rate will cause the capacitors to be charged and discharged, thereby generating the sample signal. The same signal will be sent to the variable equalizer unit 3. As has been described above, the equalizer unit 3 comprises the 100% roll-off raised cosine filter circuit 3-1 having the similar arrangement to FIG. 2, as well as the $\sqrt{f}$ filter 3-2 having the capacitors 13-1, 13-2, 13-7, 14-1, and operational amplifier 11 in FIG. 2; said filter circuits 3-1 and 3-2 being connected in series. The operation and arrangement of the variable equalizer unit 3 is substantially the same as those of the circuit of FIG. 2, and thus like numerals designate like elements in FIG. 2.

The embodiment of the variable equalizer according to the present invention has several advantages mentioned below. Firstly, the roll-off filter can suppress an abnormal increase in the peak factor of a signal waveform before sending the signal to the subsequent $\sqrt{f}$ filter, and can control its gain according to the transmission line length by adjusting the capacitors 13-1, 13-2, 13-5 and 13-6, whereby dynamic range can be uniformly distributed to each of the lines under the optimum condition. As a result, the present invention can avoid completely SN (signal-to-noise ratio) deterioration which has frequently occurred in prior art equalizer. Secondly, a replacement of the variable equalizer unit for fine adjustment by a simple flat AGC circuit will allow the circuit configuration of the present invention to be remarkably simplified. Deterioration in the equalization characteristic resulting from such circuit simplification will mainly take place only in the lower band below some 10 KHz. If a bipolar signal without any d.c. component is used as its transmission signal, however, such deterioration will not have great effect on the whole equalization characteristic.

Figure 5:
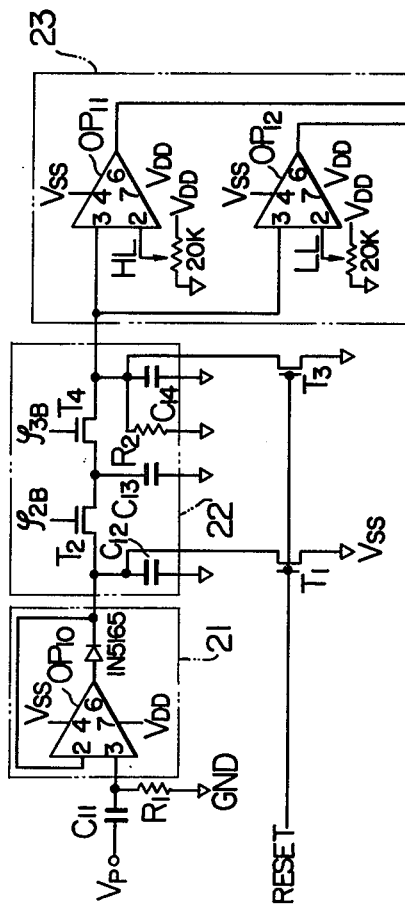
FIG. 5 is a detailed circuit diagram of blocks 5 to 8 in FIG. 1 in accordance with an embodiment of the present invention.

FIG. 5 shows a circuit diagram, in part, of an embodiment of the level detector circuit 5, comparator 7, reference signal source 6 and up-down counter 8 in FIG. 1, in accordance with the present invention. For brevity, explanation will be made in the case that the equalizer of the invention is configured to allow automatic switching to 0, 1, 2, 3, 4 and 5 Km lines.

Figure 6:
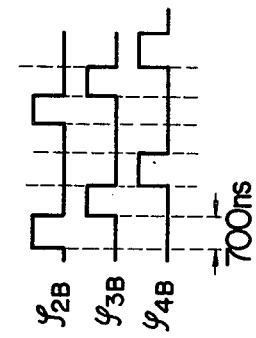
FIG. 6 shows waveforms of signals appearing at different points in FIG. 5.

The operation of the circuit of FIG. 5 will be detailed in the following. The output signal from the variable equalizer unit 4 in FIG. 1 is applied to an input terminal $V_p$. The signal is supplied to an input circuit consisting of a coupling capacitor C11 and a resistor R1, and further to a half-wave rectifier circuit 21. The rectifier circuit 21 comprises an operational amplifier OP10 and a diode 1N5165, and sends its output to a holding circuit 22 which comprises capacitors C12, C13, C14, a resistor R2 and switches T2, T4, as shown in FIG. 5. Switch driving signal $\phi_{2B}$ and $\phi_{3B}$ have such pulse waveforms as shown in FIG. 6. The output signal of the half-wave rectifier circuit 21 is charged in the capacitor C12. A potential on the capacitor C12 is held at the holding capacitor C13 with the synchronizing timing pulse $\phi_{2B}$, and further held at the capacitor C14 with the synchronizing timing pulse $\phi_{3B}$. The held output signal from the holding circuit 22 is supplied to a comparator circuit 23. In the comparator 23, the held signal or voltage is compared with respective reference voltages HL (3.1 volts) and LL (2.9 volts) at operational amplifiers OP11 and OP12, so that the amplifier OP11 will generate a voltage (corresponding to a logical value "1") when the held voltage is greater than the reference voltage HL while it will generate a voltage (corresponding to a logical value "0") if not. At the same time, the operational amplifier OP12 will generate a voltage (corresponding to a logical value "1") when the held voltage is greater than the reference voltage LL, while it will generate a voltage (corresponding to a logical value "0") if not. The outputs from the operational amplifiers OP11 and OP12 in the comparator circuit 23 are sent to a logical operation circuit 24 in synchronization with a pulse signal $\phi_{4B}$ to convert to input signals and send it to an up-down counter 26. When an input signal of the comparator 23 is a high level signal, a NAND gate 4012-1 in the logical circuit 24 will generate many outputs pulses; while if an input signal of the comparator 23 is a low level signal, a NAND gate 4012-2 will generate many output pulses. As a result, the up-down counter 26 will produce at its output terminals $Q_1$, $Q_2$ and $Q_3$ digital count values corresponding to the level, i.e., high or low of its input signal.

On the other hand, another logical operation circuit 25 is provided to prevent any malfunction of the up-down counter 26 in case of its over-flow or under-flow operation.

Figure 7:
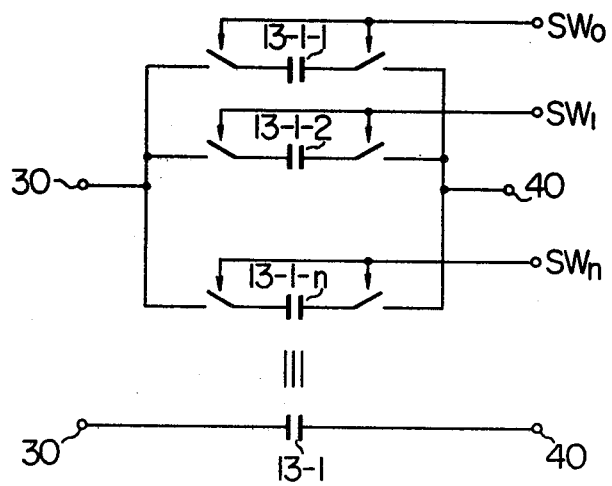
FIG. 7 is an exemplary actual circuit diagram of one of capacitor switching circuits used in FIGS. 2 and 4.

The outputs of the up-down counter 26 are decoded at a decoder 27 to select one of switches SW0 to SW5. Selected one of the switches SW0 to SW5 functions to generate a driving signal used for selection of the optimum filter for selected one of the 0, 1, 2, 3, 4 and 5 Km line lengths. More specifically, the switches are used to select desired ones of the plurality of capacitors (for example, 13-1-1 to 13-1-n, 13-2-1 to 13-2-n, . . . ) of each of the capacitors 13-1, 13-2, 13-4, 13-5, 13-6, 13-7, 13-8 as shown in FIG. 7, to thereby form a decoder suitable for the selected line length. That is, the capacitors 13-1, 13-2, 13-4, 13-5, 13-6, 13-7 and 13-8 have been shown each as a single capacitor in FIG. 2 for the purpose of brevity of the explanation, but each of the capacitors actually consists of a plurality of capacitors connected in prallel in order to make up equalizer units which match with various line lengths. Take the capacitor 13-1 for instance. The capacitor 13-1 consists of a plurality of capacitors 13-1-1, 13-1-2, . . . 13-1-n connected in parallel, as shown in FIG. 7; and corresponding one of switches SW0 to SWn is connected between two terminals 30 and 40. The same explanation holds true for the other capacitors 13-2 to 13-8.

The above explanation has been made in the case where the variable equalizer is configured to suit for 0, 1, 2, 3, 4 and 5 Km line lengths for convenience. In actual applications, however, the up-down counter circuit 26 may be made up of much more stage counters to increase the number of bits ($Q_1$, $Q_2$, $Q_3$) representative of its count contents, so that the upper bit signal is used for switching between capacitors in variable equalizer unit for coarse adjustment while the lower bit signal is used for switching between taps in a voltage divider. The voltage divider in turn forms a variable equalizer unit for fine adjustment, for example, the variable equalizer unit 4 in FIG. 4.

Further, the count outputs $Q_1$, $Q_2$ and $Q_3$ of the up-down counter circuit 26 also refers to a line length. Therefore, if the line length of a communications system for the variable equalizer of the present invention to be used has been known, then the output of the decoder 27 may be preset at the line distance value.

What is claimed is:

1. A variable equalizer for compensating a $\sqrt{f}$ characteristic of a transmission line, f being the frequency of the transmission signal on said transmission line, comprising:
   variable equalizer units connectd in series with each other and each having a stepwise variable range, said equalizer units having variable step widths different from each other;
   a comparator for comparing with a reference signal an output signal of said variable equalizer units connected in series;
   converting means for converting said comparison output signal from said comparator to a digital signal, said digital signal comprising a first portion having a predetermined number of upper order bits and a second portion having a predetermined number of lower order bits; and
   a control circuit including means for controlling one of said variable equalizer units which has a wide variable step width by said first portion of upper order bits of said digital signal and means for controlling the other of said variable equalizer units which has a narrow variable step width by said second portion of lower order bits of said digital signal.

2. A variable equalizer as set forth in claim 1 wherein at least one of said variable equalizer units has a $\sqrt{f}$ characteristic.

3. A variable equalizer as set forth in claim 1 wherein said one of the variable equalizer units having said wider variable step width comprises a variable equalizer sub-unit which has a $\sqrt{f}$ frequency characteristic and a variable filter which has a roll-off cosine frequency characteristic, i.e., which has a constant gain in the lower frequency band and a decreased gain in the higher frequency band, said sub-unit and said variable filter being connected in series with each other.

4. A variable equalizer as set forth in claim 2 or 3 wherein at least one of said variable equalizer units is made by a large scale integrated circuit, said integrated circuit having operational amplifiers, capacitors and switches for changing the connection of said capacitors.

5. A variable equalizer as set forth in claim 4 wherein said other of the variable equalizer units which has a narrow variable step width comprises a voltage divider consisting of resistors.

6. A variable equalizer as set forth in claim 1 wherein said comparator includes a rectifier circuit for rectifying said output signal of said variable equalizer units, a holding circuit for holding the peak value of a rectified signal from said rectifier circuit, a first operational amplifier for comparing an output signal of said holding circuit with a first reference level and for converting said holding circuit output signal to a two-level signal indicative of being greater or less than said first reference level, and a second operational amplifier for comparing said holding circuit output signal with a second reference level which is smaller than said first reference level and for converting said holding circuit output signal to a two-level signal indicative of being greater or less than said second reference level, and wherein said converting means includes logical operation circuits for receiving said comparison output signal from said comparator and a pulse signal having a predetermined period, an up-down counter for receiving outputs of said logical operation circuits.

7. A variable equalizer comprising:
   variable equalizer units connected in series with each other and each having a stepwise variable range, said equalizer units having variable step widths different from each other;
   a comparator for comparing with a reference signal an output signal of said variable equalizer units connected in series;
   converting means for converting said comparison output signal from said comparator to a digital signal, said digital signal comprising an upper order bit signal and a lower order bit signal; and
   a control circuit for controlling one of said variable equalizer units which has a wide variable step width by said upper bit signal while controlling the other of said variable equalizer units which has a narrow variable step width by said lower bit signal, wherein said comparator includes a rectifier circuit for rectifying said output signal of said variable equalizer units, a holding circuit for holding the peak value of a rectified signal from said rectifier circuit, a first operational amplifier for comparing an output signal of said holding circuit with a first reference level and for converting said holding circuit output signal to a two-level signal indicative of being greater or less than said first reference level, and a second operational amplifier for comparing said holding circuit output signal with a second reference level which is smaller than said first reference level and for converting said holding circuit output signal to a two-level signal indicative of being greater or less than said second reference level, and wherein said converting means includes logical operation circuits for receiving said comparison output signal from said comparator and a pulse signal having a predetermined period, an up-down counter for receiving outputs of said logical operation circuits.

8. A variable equalizer for compensating for different transmission line lengths by compensating a $\sqrt{f}$ characteristic of a transmission line, f being the frequency of the transmission signal on said transmission line, comprising:

at least first and second variable equalizer units connected in series with each other and each having a stepwise variable equalization range which corresponds to a predetermined line length range, said first equalizer unit having variable step widths corresponding to a plurality of coarse line lengths $L_i (0 \leq i \leq n)$ and said second equalizer having variable step widths corresponding to a plurality of fine line lengths $l_j (0 \leq j \leq m)$ (where m and n are integers);

a comparator for comparing with a reference signal an output signal of said variable equalizer units connected in series;

converting means for converting said comparison output signal from said comparator to a digital signal, said digital signal comprising a first portion having a predetermined number of upper order bits corresponding to a predetermined one of said plurality of coarse line lengths $L_i$ and a second portion having a predetermined number of lower order bits corresponding to a predetermined one of said plurality of fine line lengths $l_j$; and a control circuit including means for controlling said first variable unit by said first portion of upper order bits of said digital signal to select an equalization value for said predetermined one of said coarse line lengths $L_i$ and means for controlling said second variable equalizer unit by said second portion of lower order bits of said digital signal to select an equalization value for said predetermined one of said fine line lengths $l_j$ so that overall equalization is provided to compensate a combined line length of $L_i + l_j$.

9. A variable equalizer as set forth in claim 8, wherein said fine line length range $0 \leq j \leq m$ is set to substantially equal a line length corresponding to a line length interval represented by a single step change $L_i$ to $L_{i+1}$ of said coarse line length range.

10. A variable equalizer as set forth in claim 8, wherein at least one of said variable equalizer units has a $\sqrt{f}$ characteristic.

11. A variable equalizer as set forth in claim 8, wherein said first variable equalizer unit comprises a variable equalizer sub-unit which has a $\sqrt{f}$ frequency characteristic and a variable filter which has a roll-off cosine frequency characteristic, i.e., which has a constant gain in the lower frequency band and a decreased gain in the higher frequency band, said sub-unit and said variable filter being connected in series with each other.

12. A variable equalizer as set forth in claim 11, wherein at least one of said variable equalizer units is made by a large scale integrated circuit, said integrated circuit having operational amplifiers, capacitors and switches for changing the connection of said capacitors.

13. A variable equalizer as set forth in claim 12, wherein said first variable equalizer unit is comprised of said large scale integrated circuit and said second variable equalizer unit comprises a voltage divider comprised of resistors to implement the selection of equalization for a fine line length value.

* * * * *